(12) United States Patent
Goel

(10) Patent No.: US 11,703,242 B2
(45) Date of Patent: *Jul. 18, 2023

(54) AVOIDING COIL FREEZE IN HVAC SYSTEMS

(71) Applicant: Lennox Industries Inc., Richardson, TX (US)

(72) Inventor: Rakesh Goel, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,456

(22) Filed: Aug. 30, 2022

(65) Prior Publication Data

US 2022/0412593 A1     Dec. 29, 2022

Related U.S. Application Data

(63) Continuation of application No. 16/580,486, filed on Sep. 24, 2019, now Pat. No. 11,460,207.

(51) Int. Cl.
| | |
|---|---|
| *F24F 11/64* | (2018.01) |
| *F24F 11/65* | (2018.01) |
| *F24F 11/43* | (2018.01) |
| *G05B 13/02* | (2006.01) |
| *F25B 49/02* | (2006.01) |

(Continued)

(52) U.S. Cl.
CPC .............. *F24F 11/43* (2018.01); *F24F 11/64* (2018.01); *F24F 11/65* (2018.01); *F25B 49/022* (2013.01); *G05B 13/024* (2013.01); *F24F 2013/221* (2013.01); *F24F 2140/30* (2018.01); *F25B 2600/025* (2013.01)

(58) Field of Classification Search
CPC .. F24F 11/43; F24F 11/64; F24F 11/65; F24F 2013/221; F24F 2140/30; F25B 49/022; F25B 2600/025; G05B 13/024
See application file for complete search history.

(56) References Cited

U.S. PATENT DOCUMENTS

| | | | | |
|---|---|---|---|---|
| 2004/0134207 | A1* | 7/2004 | Morita | ............... B60H 1/00792 62/158 |
| 2005/0235664 | A1* | 10/2005 | Pham | ...................... F04C 28/00 62/126 |

(Continued)

*Primary Examiner* — Kidest Bahta
(74) *Attorney, Agent, or Firm* — Baker Botts L.L.P.

(57) ABSTRACT

An HVAC system includes an evaporator. The evaporator includes a sensor configured to measure a property value (i.e., a saturated suction temperature or a saturated suction pressure) associated with saturated refrigerant flowing through the evaporator. The system includes a variable-speed compressor configured to receive the refrigerant and compress the received refrigerant. The system includes a controller communicatively coupled to the sensor and the variable-speed compressor. The controller monitors the property value measured by the sensor and detects a system fault, based on the monitored property value. In response to detecting the system fault, the controller operates the compressor in a freeze-prevention mode, which is configured to maintain the property value above a setpoint value by adjusting a speed of the variable-speed compressor. This prevents or delays freezing of the evaporator during operation of the system during the detected system fault.

20 Claims, 3 Drawing Sheets

(51) Int. Cl.
  *F24F 140/30* (2018.01)
  *F24F 13/22* (2006.01)

(56) References Cited

U.S. PATENT DOCUMENTS

| | | | | |
|---|---|---|---|---|
| 2009/0183519 A1* | 7/2009 | Nishikawa | ............ | F25B 49/005 |
| | | | | 62/132 |
| 2015/0267953 A1* | 9/2015 | Hung | ............ | F25D 21/04 |
| | | | | 62/115 |
| 2018/0139870 A1* | 5/2018 | Meadows | ............ | F25B 41/22 |

* cited by examiner

AVOIDING COIL FREEZE IN HVAC SYSTEMS

CROSS-REFERENCE TO RELATED APPLICATION

The application is a continuation of U.S. patent application Ser. No. 16/580,486, filed Sep. 24, 2019, by Rakesh Goel, and entitled "AVOIDING COIL FREEZE IN HVAC SYSTEMS," which is incorporated herein by reference.

TECHNICAL FIELD

The present disclosure relates generally to heating, ventilation, and air conditioning (HVAC) systems and methods of their use. In certain embodiments, the present disclosure relates to avoiding coil freeze in HVAC systems.

BACKGROUND

Heating, ventilation, and air conditioning (HVAC) systems are used to regulate environmental conditions within an enclosed space. Air is cooled via heat transfer with refrigerant flowing through the HVAC system and returned to the enclosed space as conditioned air.

SUMMARY OF THE DISCLOSURE

In an embodiment, a heating, ventilation, and air conditioning (HVAC) system includes an evaporator configured to receive a refrigerant and transfer heat from a flow of air to the refrigerant. The evaporator includes a sensor configured to measure a property value associated with saturated refrigerant flowing through the evaporator. The property value includes a saturated suction temperature and/or a saturated suction pressure. The HVAC system includes a variable-speed compressor configured to receive the refrigerant and compress the received refrigerant. The HVAC system includes a controller communicatively coupled to the sensor and the variable-speed compressor. The controller monitors the property value measured by the sensor and detects a system fault (e.g., a loss of charge or an insufficient rate of airflow across the evaporator), based on the monitored property value. In response to detecting the system fault, the controller operates the variable-speed compressor in a freeze-prevention mode. The freeze-prevention mode is configured to maintain the monitored property value above a setpoint value by adjusting a speed of the variable-speed compressor. This prevents or delays freezing of the evaporator during operation of the HVAC system during the detected system fault.

HVAC systems can experience a loss of charge because of a leak of refrigerant from system components or conduit connecting components. A loss of charge can cause refrigerant flowing through an evaporator of the HVAC system to reach freezing or near-freezing temperatures (e.g., of about 32° F.). An insufficient flow of air across the evaporator can also cause the refrigerant to reach freezing or near-freezing temperatures. Such temperatures can cause a portion of the evaporator or nearby conduit to freeze, which can result in damage to the evaporator and/or other components of the HVAC system. Accordingly, in conventional systems, the HVAC system generally shuts down when refrigerant in the evaporator reaches freezing or near-freezing temperatures. For instance, a freeze-stat of the system may monitor refrigerant temperature and cause the system to automatically shut down when freezing or near-freezing temperatures are observed. This can result in extended down times during which cooling cannot be provided while the system is being maintenance to correct the source of the fault (e.g., the loss of charge and/or insufficient airflow rate across the evaporator).

The unconventional HVAC system contemplated in this disclosure solves problems of previous technology, including those described above, by facilitating extended operation during a loss of charge or other system fault (e.g., when a rate of airflow across the evaporator is insufficient) by preventing or at least delaying the onset of freezing in the evaporator. The present disclosure encompasses the recognition that freezing of an evaporator can be prevented or delayed, while providing continued operation of the HVAC system during a system fault, by controlling the speed of a variable speed compressor based on a saturated suction temperature or pressure of the evaporator once the saturated suction temperature or pressure falls below a threshold value indicative of the fault. Accordingly, some embodiments of the system described in this disclosure facilitate continued cooling of a space while preventing or delaying freezing of an evaporator. The systems and methods described in this disclosure may be integrated into a practical application for improving the performance of HVAC systems by, in some embodiments, preventing damage to HVAC systems while also increasing the time during which cooling is still provided following a loss of charge.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

As described above, prior to the present disclosure, there was a lack of tools for preventing or delaying freezing in an evaporator while still providing cooling when an HVAC system is experiencing a fault such as a loss of charge (e.g., a leak of refrigerant) or a low rate of airflow across an evaporator. This disclosure encompasses the unique recognition that freezing can be prevented or delayed by operating the HVAC system in a freeze-prevention mode such that the speed of a variable speed compressor is controlled based on a saturated suction temperature (e.g., a temperature at or adjacent to an inlet of a coil of the evaporator) rather than on a discharge air temperature or indoor air temperature, as is done during normal operation. The freeze-prevention mode prevents or delays freezing while facilitating continued cooling by the HVAC system. In some embodiments, feedback control is employed to implement the freeze-prevention mode in order to maintain the saturated suction temperature or pressure at or near a setpoint value to prevent freezing while providing improved cooling. In some embodiments, a trend in the value of the saturated suction temperature or pressure is used to anticipate a fault and cause the system to preemptively operate in the freeze-prevention mode.

HVAC System

Figure 1:
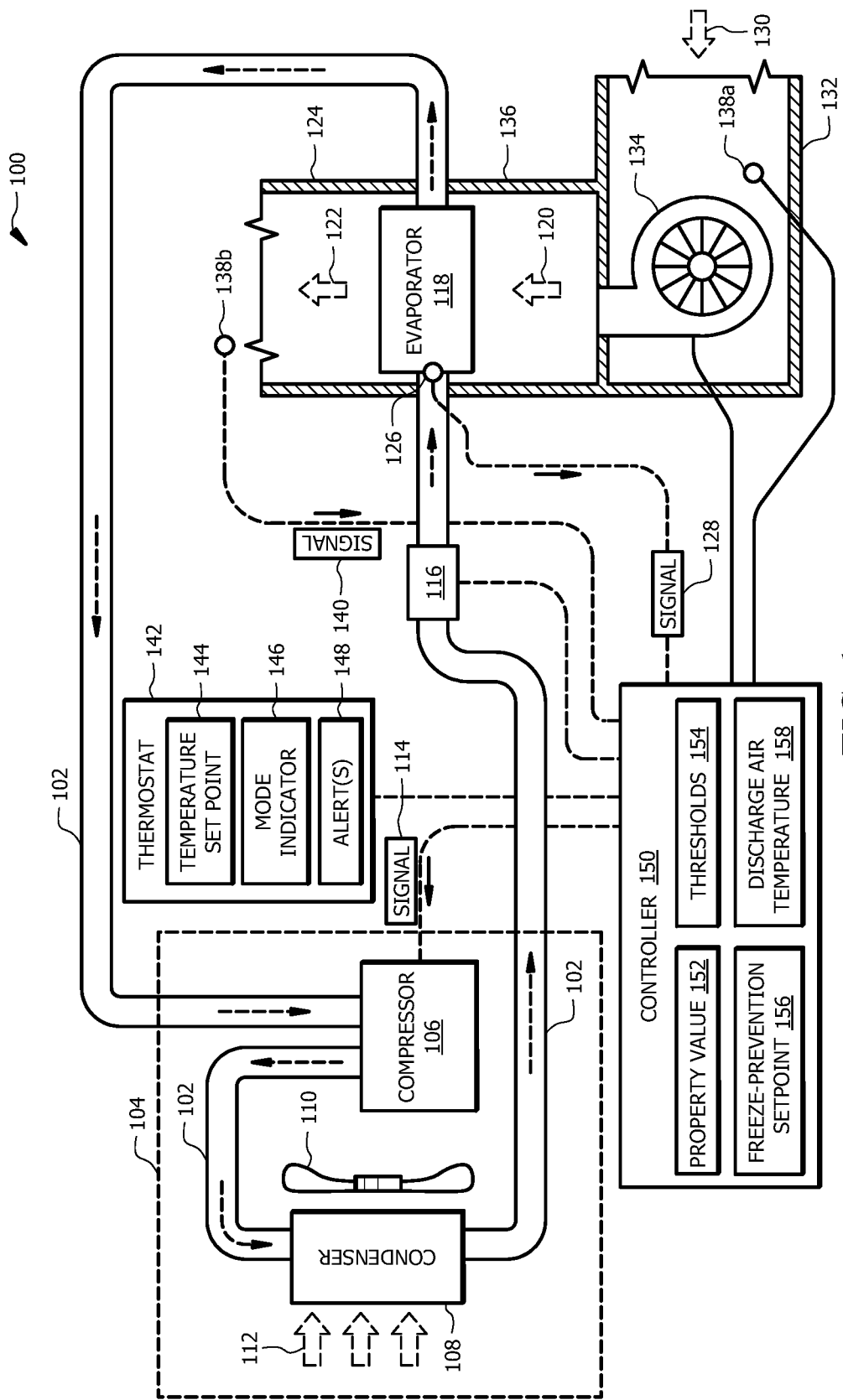
FIG. 1 is a diagram of an example HVAC system configured to prevent or delay freezing during a system fault by operating in a freeze-prevention mode.

FIG. 1 is a schematic diagram of an embodiment of an HVAC system 100 configured for operation in a freeze-prevention mode following detection of a system fault. The HVAC system 100 conditions air for delivery to a conditioned space. The conditioned space may be, for example, a room, a house, an office building, a warehouse, or the like. In some embodiments, the HVAC system 100 is a rooftop unit (RTU) that is positioned on the roof of a building and the conditioned air is delivered to the interior of the building. In other embodiments, portion(s) of the system may be located within the building and portion(s) outside the building. The HVAC system 100 may include one or more heating elements, not shown for convenience and clarity. The HVAC system 100 may be configured as shown in FIG. 1 or in any other suitable configuration. For example, the HVAC system 100 may include additional components or may omit one or more components shown in FIG. 1.

The HVAC system 100 includes a working-fluid conduit subsystem 102, at least one condensing unit 104, an expansion valve 116, an evaporator 118, a blower 134, a thermostat 142, and a controller 150. The controller 150 of the HVAC system 100 is generally configured to detect a system fault (e.g., a loss of charge and/or an insufficient rate of airflow 120 across evaporator 118) based on signal 128 received from sensor 126. The detected fault is generally associated with a saturated suction temperature or pressure of the evaporator falling to or below a minimum threshold value (e.g., 32° F.). To facilitate fault detection, sensor 126 is positioned and configured to measure a property value 152 (e.g., a saturated suction temperature or a saturated suction pressure) of refrigerant flowing through the evaporator 118. The property value 152 is used to detect a system fault (e.g., based on the saturated suction temperature or pressure falling below the threshold value).

After the fault is detected, the controller 150 causes the compressor 106 to operate in a freeze-prevention mode which generally corresponds to decreasing a speed of the compressor 106. The decreased compressor speed may be based on the saturated suction temperature or pressure. For example, the speed of the compressor 106 may be adjusted using a feedback loop (see FIG. 2) to maintain the saturated suction temperature or pressure at or near a setpoint value 156 that is above a freezing condition (e.g., 32° F.). For example, the setpoint value 156 for the saturated suction temperature may be 34° F., a value which prevents freezing in and around the evaporator 118, while still allowing the HVAC system 100 to provide cooling. When the HVAC system 100 is operated in the freeze-prevention mode, one or more signals may be transmitted to thermostat 142 for display of a mode indicator 146 and/or an alert 148.

The working-fluid conduit subsystem 102 facilitates the movement of a working fluid (e.g., a refrigerant) through a cooling cycle such that the working fluid flows as illustrated by the dashed arrows in FIG. 1. The working fluid may be any acceptable working fluid including, but not limited to, fluorocarbons (e.g. chlorofluorocarbons), ammonia, non-halogenated hydrocarbons (e.g. propane), hydrofluorocarbons (e.g. R-410A), or any other suitable type of refrigerant.

The condensing unit 104 includes a compressor 106, a condenser 108, and a fan 110. In some embodiments, the condensing unit 104 is an outdoor unit while other components of system 100 may be located indoors. The compressor 106 is coupled to the working-fluid conduit subsystem 102 and compresses (i.e., increases the pressure of) the working fluid. The compressor 106 of condensing unit 104 is a variable-speed compressor. The variable-speed compressor 106 is generally configured to operate at different speeds to increase the pressure of the working fluid, for example, to keep the working fluid moving along the working-fluid conduit subsystem 102. For example, the speed of variable-speed compressor 106 can be modified to adjust the cooling capacity of the HVAC system 100.

The compressor 106 is in signal communication with the controller 150 using wired or wireless connection. The controller 150 provides commands or signals to control operation of the compressor 106 and/or receives signals from the compressor 106 corresponding to a status of the compressor 106. For example, the controller 150 may transmit signal 114 to adjust compressor speed according to a measured property value 152. The controller 150 may operate the compressor 106 in different modes corresponding to load conditions (e.g., the amount of cooling or heating required by the HVAC system 100) or whether a fault has been detected based on property value 152, as described in greater detail below. The controller 150 is described in greater detail with respect to FIG. 4.

The condenser 108 is configured to facilitate movement of the working fluid through the working-fluid conduit subsystem 102. The condenser 108 is generally located downstream of the compressor 106 and is configured to remove heat from the working fluid. The fan 110 is configured to move air 112 across the condenser 108. For example, the fan 110 may be configured to blow outside air through the condenser 108 to help cool the working fluid flowing therethrough. The compressed, cooled working fluid flows from the condenser 108 toward the expansion device 116.

The expansion device 116 is coupled to the working-fluid conduit subsystem 102 downstream of the condenser 108 and is configured to remove pressure from the working fluid. In this way, the working fluid is delivered to the evaporator 118 and receives heat from airflow 120 to produce a conditioned airflow 122 that is delivered by a duct subsystem 124 to the conditioned space. In general, the expansion device 116 may be a valve such as an expansion valve or a flow control valve (e.g., a thermostatic expansion valve valve) or any other suitable valve for removing pressure from the working fluid while, optionally, providing control of the rate of flow of the working fluid. The expansion device 116 may be in communication with the controller 150 (e.g., via wired and/or wireless communication) to receive control signals for opening and/or closing associated valves and/or provide flow measurement signals corresponding to the rate of working fluid through the working-fluid conduit subsystem 102.

The evaporator 118 is generally any heat exchanger configured to provide heat transfer between air flowing through (or across) the evaporator 118 (i.e., air contacting an outer surface of one or more coils of the evaporator 118) and working fluid passing through the interior of the evaporator 118. The evaporator 118 may include one or more circuits. The evaporator 118 is fluidically connected to the compressor 106, such that working fluid generally flows from the evaporator 118 to the condensing unit 104. A portion of the HVAC system 100 is configured to move air 120 across the evaporator 118 and out of the duct sub-system 124 as conditioned airflow 122. Sensor 126 may be disposed on or in evaporator 118. Sensor 126 may include a temperature and/or a pressure sensor. For example, sensor 126 may include a pressure sensor positioned (e.g., placed at or adjacent to the inlet of the evaporator 118) and configured to measure a saturated suction pressure. Sensor 126 may include a temperature sensor positioned (e.g., placed at or adjacent to the inlet of the evaporator 118) and configured to measure a saturated suction temperature. Measurement data (e.g., temperature and/or pressure information) from sensor 126 may be transmitted to controller 150 via corresponding signal 128 illustrated in FIG. 1.

Return air 130, which may be air returning from the building, air from outside, or some combination, is pulled into a return duct 132. A suction side of the blower 134 pulls the return air 130. The blower 134 discharges airflow 120 into a duct 136 such that airflow 120 crosses the evaporator 118 or heating elements (not shown) to produce conditioned airflow 122. The blower 134 is any mechanism for providing a flow of air through the HVAC system 100. For example, the blower 134 may be a constant-speed or variable-speed circulation blower or fan. Examples of a variable-speed blower include, but are not limited to, belt-drive blowers controlled by inverters, direct-drive blowers with electronic commuted motors (ECM), or any other suitable type of blower. The blower 134 is in signal communication with the controller 150 using any suitable type of wired or wireless connection. The controller 150 is configured to provide commands and/or signals to the blower 134 to control its operation.

The HVAC system 100 includes one or more sensors 138a-b in signal communication with controller 150. Sensors 138a-b may include any suitable type of sensor for measuring air temperature, relative humidity, and/or any other properties of a conditioned space (e.g. a room or building). The sensors 138a-b may be positioned anywhere within the conditioned space, the HVAC system 100, and/or the surrounding environment. For example, as shown in the illustrative example of FIG. 1, the HVAC system 100 may include a sensor 138a positioned and configured to measure a return air temperature (e.g., of airflow 130) and/or a sensor 138b positioned and configured to measure a discharge air temperature 158 (e.g., of airflow 122), a temperature of the conditioned space, and/or a relative humidity of the conditioned space. A signal 140 corresponding to the discharge air temperature 158 measured by sensor 138b may be provided to the controller 150. Signal 140 (e.g., associated with the discharge air temperature 158 measured by sensor 138b) may be used to control operation of the HVAC system 100 in a normal mode (i.e., when a fault is not detected), as described in greater detail below. In other examples, the HVAC system 100 may include sensors positioned and configured to measure any other suitable type of air temperature (e.g., the temperature of air at one or more locations within the conditioned space and/or an outdoor air temperature) or other property (e.g., a relative humidity of air at one or more locations within the conditioned space).

The HVAC system 100 includes a thermostat 142, for example, located within the conditioned space (e.g. a room or building). The thermostat 142 is generally in signal communication with the controller 150 using any suitable type of wired and/or wireless connection. The thermostat 142 may be a single-stage thermostat, a multi-stage thermostat, or any suitable type of thermostat as would be appreciated by one of ordinary skill in the art. The thermostat 142 is configured to allow a user to input a desired temperature or temperature setpoint 144 for the conditioned space and/or for a designated space or zone such as a room in the conditioned space. The controller 150 may use information from the thermostat 142 such as the temperature setpoint 144 for controlling the compressor 106 and/or the blower 134 (e.g., based on information from one or more of sensors 126 and 138a-b). In some embodiments, the thermostat 142 includes a user interface and display for displaying information related to the operation and/or status of the HVAC system 100. For example, the user interface may display operational, diagnostic, and/or status messages and provide a visual interface that allows at least one of an installer, a user, a support entity, and a service provider to perform actions with respect to the HVAC system 100. For example, the user interface may provide for display of a mode indicator 146 (e.g., indicating whether the HVAC system 100 is operating in a normal mode or a freeze-prevention mode), alerts 150 (e.g., associated with a fault determined based on information from one or more of sensors 126 and 138a-b), and/or any other messages related to the status and/or operation of the HVAC system 100.

As described in greater detail below, the controller 150 is configured to receive at least signals 128 and 140 from sensors 126 and 138b. Signal 128 may be used to determine property value 152 (e.g., a saturated suction temperature or pressure measured by sensor 126). Signal 140 may be used to determine a discharge air temperature 158 of discharge airflow 122. The controller 150 uses threshold(s) 154 to determine whether to operate in a normal mode or a freeze-prevention mode, based on the property value 152. During operation in the freeze-prevention mode, the controller 150 uses a freeze-operation setpoint value 156 (e.g., a value set or adjusted via thermostat 142), which corresponds to a target property value 152 at which to operate the HVAC system according to the freeze-prevention mode. The controller 150 is described in greater detail below with respect to FIG. 4.

As described above, in certain embodiments, connections between various components of the HVAC system 100 are wired. For example, conventional cable and contacts may be used to couple the controller 150 to the various components of the HVAC system 100, including, the compressor 106, the expansion valve 116, sensors 126, 138a-b, the blower 134, and thermostat 142. In some embodiments, a wireless connection is employed to provide at least some of the connections between components of the HVAC system 100. In some embodiments, a data bus couples various components of the HVAC system 100 together such that data is communicated therebetween. In a typical embodiment, the data bus may include, for example, any combination of hardware, software embedded in a computer readable medium, or encoded logic incorporated in hardware or otherwise stored (e.g., firmware) to couple components of HVAC system 100 to each other. As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 150 to other components of the HVAC system 100.

In an example operation of HVAC system 100, the HVAC system 100 starts up to provide cooling to a space based on temperature setpoint 144. For example, in response to the indoor temperature exceeding the temperature setpoint 144, the controller 150 may cause the compressor 106 and the blower 134 to turn on to start up the HVAC system 100. During operation of the HVAC system 100, the controller 150 receives signal 128 to monitor property value 152, which may be a saturated suction temperature or a saturated suction pressure. In general, signal 128 may be received periodically or at intervals (e.g., each second, each 30 seconds, each minute, or the like).

If the HVAC system 100 experiences a loss of charge, the cooling capacity of the system 100 decreases. In order to compensate for the loss of capacity, the controller 150 may increase the speed of compressor 106 until a maximum speed is reached. Further loss of charge may cause the saturated suction temperature or pressure of refrigerant flowing through the evaporator 118 to decrease to a freezing, or near-freezing temperature. Similarly, if the rate of airflow 120 across evaporator is insufficient (e.g., because of a malfunctioning blower 134), refrigerant flowing through the evaporator 118 may approach or reach a freezing, or near freezing, temperature.

The controller 150 may detect a system fault based on the monitored property value 152. For example, the system fault may correspond to one or more of a loss of charge (e.g., a leak of working fluid from the HVAC system 100) and an insufficient rate of airflow 120 across the evaporator 118. The system fault may be detected, for example, by comparing the property value 152 to a threshold value (e.g., threshold 412 of FIG. 4) of thresholds 154 and determining whether the property value 152 is less than or equal to the threshold value. For example, the threshold may be a temperature of 32° F. (or a corresponding saturation pressure of the working fluid). If the property value 152 is less than or equal to the threshold value, a system fault is detected. For example, if the property value 152 is a saturated suction temperature of 31° F. and the threshold value is 32° F., a system fault is detected. In some embodiments, the property value 152 may need to be less than or equal to the threshold value for at least a minimum interval of time (e.g., of 30 seconds, 5 minutes, 15 minutes, or any other appropriate interval of time as appreciated by one skilled in the art) before a fault is detected.

In response to detecting the system fault, the controller 150 may operate the compressor 106 in a freeze-prevention mode. The freeze-prevention mode may be configured to maintain the monitored property value 152 above, at, or near (e.g., within 1 or 2° F.) a setpoint value 156 by adjusting (e.g., decreasing as necessary) the speed of compressor 106. In general, during operation in the freeze-prevention mode, the temperature setpoint 144 and/or the discharge air temperature 158 may be ignored (i.e., the controller 150 may not determine compressor speed based on these parameters). The setpoint value 156 may be selected to prevent freezing in or around the evaporator 118. For example, the setpoint value 156 may be a temperature of 34° F. (or a corresponding saturation pressure of the working fluid). Upon detecting the system fault, the controller 152 may transmit signal 114 to adjust the speed of compressor 106. For example, signal 114 may initially cause the compressor to operate at a first reduced compressor speed that is portion of (e.g., 90% of) the current compressor speed (e.g., or of a maximum speed recommended by the manufacturer of the compressor). The controller 150 may continue to monitor the property value 152 and compare it to the setpoint value 156. If, after a period of time, the property value 152 is greater than or equal to the setpoint value 156, the compressor may be maintained at the first reduced compressor speed. Otherwise, if the property value 152 is less than the setpoint value 156, the controller 150 may further decrease the compressor speed to a second reduced compressor speed (e.g., of 80% of the maximum recommended compressor speed). The compressor speed may continue to be decreased until the property value 152 is maintained at or above the setpoint value 156. This gradual decrease of compressor speed generally prevents or delays freezing of the evaporator 118 while facilitating continued cooling during the system fault.

Figure 2:
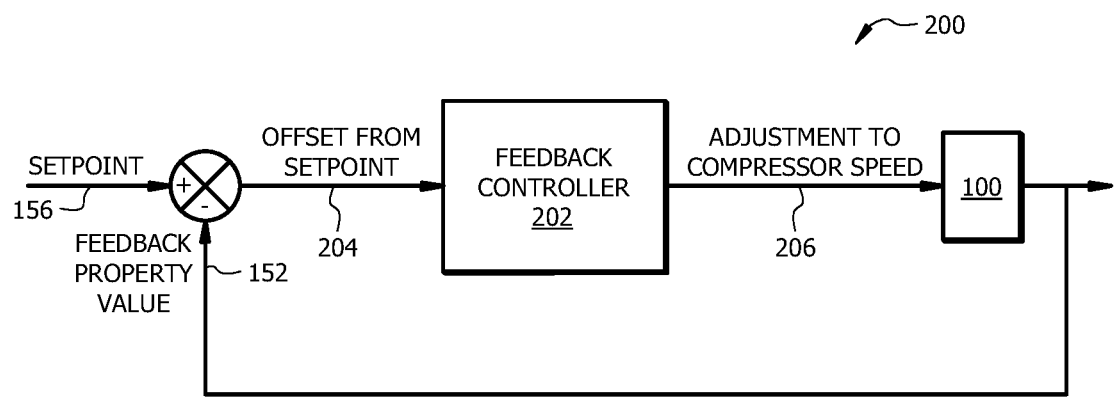
FIG. 2 is a diagram illustrating an example feedback control loop for implementing a freeze-prevention mode in the HVAC system illustrated in FIG. 1.

In some embodiments, a feedback loop is employed to periodically adjust the speed of compressor 106 (i.e., via signal 114) such that the property value 156 is maintained at or near (e.g., within 1 or 2° F.) of the setpoint value 156. FIG. 2 illustrates an example feedback control loop 200 for operating the HVAC system 100 in a freeze-prevention mode. The controller 150 of FIG. 1 may be the feedback controller 202 of FIG. 2, which is configured to implement the control loop 200. For example, the feedback controller 202 may be a proportional (P) controller, a proportional-integral (PI) controller, a proportional-integral-derivative (PID) controller, or any other appropriate controller for implementing control loop 200. In the feedback control loop 200, a difference 204 is determined between the setpoint value 156 and the monitored property value 152. The feedback controller 202 determines an adjustment 206 to the compressor speed based on difference 204. The adjustment 206 may be an amount to decrease or increase the speed of compressor 106. Operation of system 100 is modified, for example, by transmitting signal 114 to compressor 106 to implement adjustment 206. After adjustment 206 is implemented, the new property value 152 is determined and is returned through the loop 200 to determine an updated difference 204 and a corresponding adjustment 206. Use of a feedback loop, such as feedback loop 200 illustrated in FIG. 2, may provide improved cooling during the system fault while still preventing or delaying freezing in or around the evaporator 118 because evaporator 118 is maintained at a low but non-freezing temperature.

Returning to FIG. 1, in some cases, the controller 150 may determine that a fault is no longer detected and may cause the HVAC system 100 (e.g., or compressor 106) to operate in a normal mode. The normal mode generally corresponds to a condition in which the speed of compressor 106 is determined based on discharge air temperature 158 (e.g., a temperature of airflow 122 determined by sensor 138b and provided to the controller 150 via signal 140). For example, the controller 150 may determine that the property value 152 is greater than or equal to a second threshold of thresholds 154 (e.g., threshold 414 of FIG. 4, corresponding to a saturated suction temperature of 36° F.). In response to detecting this condition, the controller 150 may adjust the compressor speed based on a difference between the discharge air temperature 158 and a corresponding normal mode setpoint (e.g., setpoint 416 of FIG. 4). For example, the normal mode setpoint may be a temperature that is the same as or based on the temperature setpoint 144. A similar control loop to that shown in FIG. 2 may be used for operation in the normal mode.

In response to detecting a system fault, an alert signal may be transmitted to the thermostat 142 (e.g., for presentation as alert 148 on a user interface or display of the thermostat 142). Similarly, the controller may transmit a signal to the thermostat 142 to cause display of a mode indicator 146, which may include an indication of whether the HVAC system 100 (e.g., or the compressor 106 of the HVAC system 100) is operating in a normal mode or a freeze-prevention mode. As described above, the normal mode may correspond to operation of the HVAC system 100 such that compressor speed is controlled based on the discharge air temperature 158. The freeze-prevention mode generally corresponds to operation of the HVAC system 100 such that compressor speed is determined based on a saturated suction temperature or pressure (i.e., property value 152).

In some embodiments, a trend in the value of the saturated suction temperature or pressure is used to anticipate a fault and cause the system to preemptively operate in the freeze-prevention mode. For example, the controller 150 may monitor the property value 152 over a period of time. The monitored property value 152 may be used to determine a trend in the property value 152 (e.g., based on a time derivative of the property value 152 or a slope of the property value 152 plotted over time). Based on this trend, the controller 150 may determine that a system fault is anticipated. The controller 150 may estimate an onset time for the anticipated fault (e.g., based on the time derivative and/or slope described above). For example, if the current saturated suction temperature is 34° F. and the controller 150 has determined that the saturated suction temperature is decreasing, according to the trend, by about 0.5° F. per hour, the controller 150 may anticipate a fault condition to be reached in about 4 hours (i.e., the time required to reach a threshold temperature of 32° F.). In response to anticipating the future system fault, the controller 150 may immediately, or after a delay time, operate the compressor 106 in the freeze-prevention mode. For instance, in the example described above, the controller 150 may wait two hours before initiating the freeze-prevention mode (e.g., to maintain the system 100 at a maximum cooling capacity before the saturated suction temperature reaches an anticipated value of 33° F. and the compressor speed is decreased in the freeze-prevention mode).

Example Method of Operation

Figure 3A:
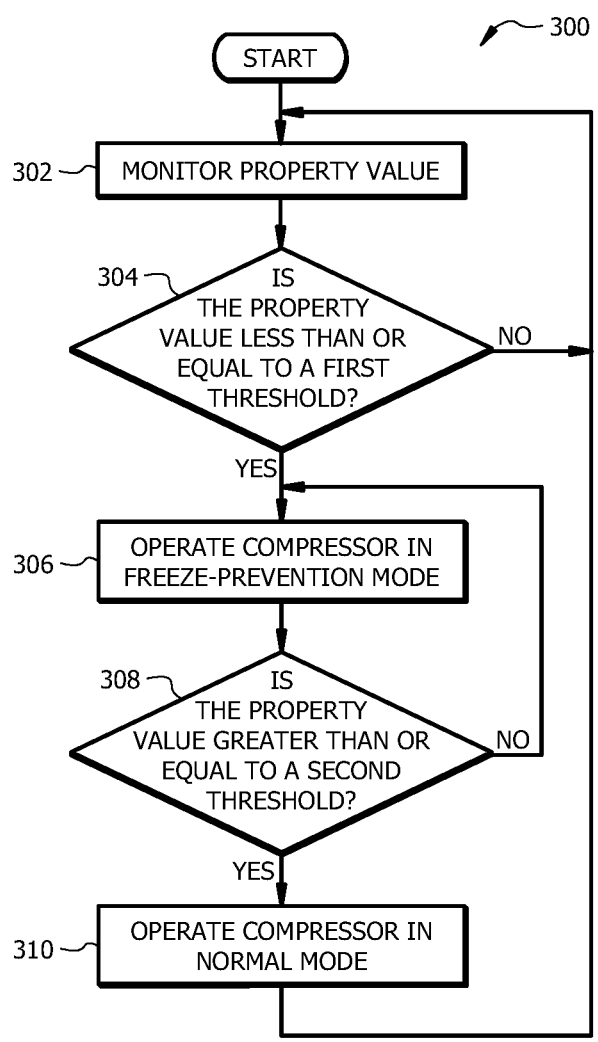
FIGS. 3A-B are flowcharts of example methods for preventing or delaying freezing of an evaporator of the HVAC system illustrated in FIG. 1.

FIG. 3A is a flowchart illustrating an example method 300 of preventing or delaying freezing in or around the evaporator 118 of the HVAC system 100 illustrated in FIG. 1. Method 300 generally facilitates the detection of system faults and subsequent operation of the HVAC system 100 in a freeze-prevention mode. The method 300 may begin at step 302 where the controller 150 monitors property value 152. For example, the controller 150 may receive signal 128 from sensor 126 to monitor the property value 152. The property value 152 is generally a saturated suction temperature or a saturated suction pressure of evaporator 118.

Figure 4:
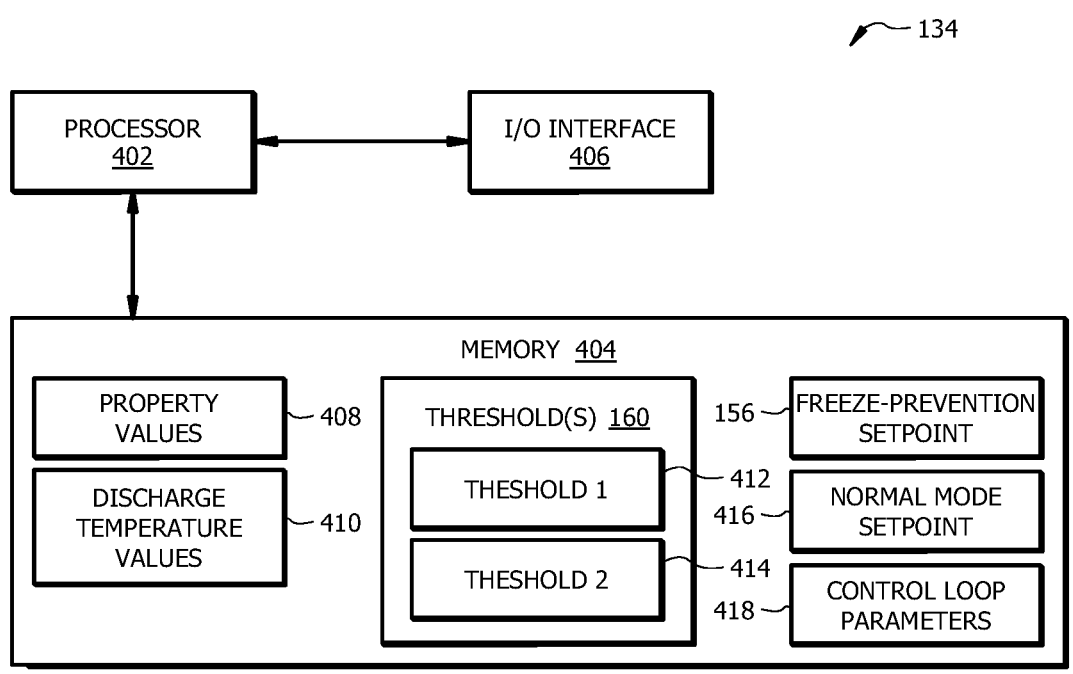
FIG. 4 is a diagram of an example controller of the HVAC system illustrated in FIG. 1.

At step 304, in order to detect a system fault, the controller 150 determines whether the property value is less than or equal to a first threshold value of thresholds 154 (e.g., first threshold 412 of FIG. 4). For example, the first threshold may be 32° F. (e.g., or a corresponding saturation pressure for the working fluid). In some embodiments, the property value 152 must be less than or equal to the threshold value for at least a minimum interval of time (e.g., of 30 seconds, 5 minutes, 15 minutes) before the conditions of step 304 are considered to be satisfied (i.e., to proceed to step 306). Generally, if the conditions of step 304 are satisfied, the controller 150 determines that a system fault is detected. Otherwise, the controller returns to step 302 and continues to monitor the property value 152.

Figure 3B:
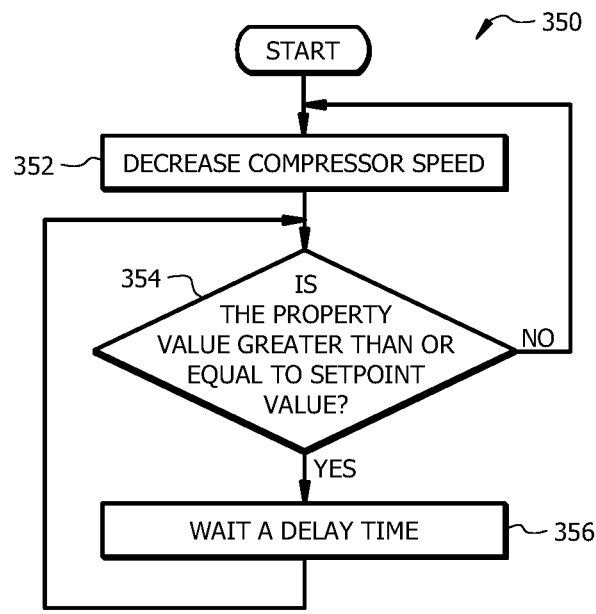

At step 306, if the property value 152 is less than or equal to the first threshold value (e.g., threshold 412 of FIG. 4), the controller 150 causes the compressor 106 to operate in the freeze-prevention mode. FIG. 3B illustrates an example method 350 of operating in a freeze-prevention mode. At step 352 of method 350, the speed of compressor 106 is decreased. For example, controller 150 may transmit a signal 114, which provides instructions indicating an amount to decrease the speed of compressor 106 or a speed at which to operate compressor 106. The speed may be decreased to a predefined speed (e.g., 90% of the maximum speed), by a predefined amount (e.g., by 10% or the like), or by an amount based on the difference between the monitored property value 152 and the setpoint value 156. For example, the amount the speed of the compressor 106 (e.g., relative to the maximum recommended speed) is decreased may be proportional to the difference between the monitored property value 152 and the setpoint value 156, such that, for example, a larger difference corresponds to a larger decrease in compressor speed.

At step 354, after the compressor speed is decreased (e.g., after a period of time of 5 minutes or more following decreasing the compressor speed), the controller 150 determines whether the property value 152 has shifted to a value that is greater than or equal to the setpoint value 156. If the property value 152 is less than the setpoint value 156, the controller 150 may return to step 352 and further decrease the compressor speed. If the property value 152 is greater than or equal to the setpoint value 156, the compressor 106 may be maintained at the reduced compressor speed, during step 356, for at least a delay time (e.g., of 5 minutes or more). As described above, in some embodiments, the method 350 is implemented using a feedback control loop, such as control loop 200 described above with respect to FIG. 2.

Referring again to FIG. 3A, at step 308, the controller 150 determines whether the property value 152 is greater than or equal to a second threshold value (e.g., second threshold 414 of FIG. 4). The second threshold value is greater than the first. For example the second threshold value may be 36° F. (e.g., or a corresponding saturation pressure for the working fluid). Generally, if the property value 152 reaches the second threshold value, the HVAC system 100 is likely no longer experiencing a system fault, or the system 100 no longer needs to operate in the freeze-prevention mode. Accordingly, if the condition of step 308 is satisfied, the controller may cause the compressor 106 to operate in a normal mode at step 310. As described above, the normal mode generally corresponds to adjusting the speed of compressor 106 based on discharge air temperature 158. In other words, during operation in the normal mode, the controller 150 may adjust the compressor speed based on a difference between the discharge air temperature 158 and a corresponding setpoint (e.g., normal mode setpoint 416 of FIG. 4). A similar control loop to that shown in FIG. 2 may be used to implement normal mode operation.

Modifications, additions, or omissions may be made to methods 300 and 350 depicted in FIGS. 3A-B. Methods 300 and 350 may include more, fewer, or other steps. For example, steps may be performed in parallel or in any suitable order. While at times discussed as controller 150, HVAC system 100, or components thereof performing the steps, any suitable HVAC system or components of the HVAC system may perform one or more steps of the method.

Example Controller

FIG. 4 is a schematic diagram of an embodiment of the controller 150. The controller 150 includes a processor 402, a memory 404, and an input/output (I/O) interface 406.

The processor 402 includes one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs) that communicatively couples to memory 404 and controls the operation of HVAC system 100. The processor 402 may be a programmable logic device, a microcontroller, a microprocessor, or any suitable combination of the preceding. The processor 402 is communicatively coupled to and in signal communication with the memory 404. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory 404 and executes them by directing the coordinated operations of the ALU, registers, and other components. The processor 402 may include other hardware and software that operates to process information, control the HVAC system 100, and perform any of the functions described herein (e.g., with respect to FIGS. 3A-B). The processor 402 is not limited to a single processing device and may encompass multiple processing devices. Similarly, the controller 150 is not limited to a single controller but may encompass multiple controllers.

The memory 404 includes one or more disks, tape drives, or solid-state drives, and may be used as an over-flow data storage device, to store programs when such programs are selected for execution, and to store instructions and data that are read during program execution. The memory 404 may be volatile or non-volatile and may include ROM, RAM, ternary content-addressable memory (TCAM), dynamic random-access memory (DRAM), and static random-access memory (SRAM). The memory 404 is operable to store property values 408, discharge air temperature values 410, thresholds 154 (i.e., including a first threshold 412 and a second threshold 414), freeze-prevention setpoint value 156, a normal mode setpoint 416, control loop parameters 418, and/or any other logic and/or instructions for performing the function described in this disclosure.

The property values 408 generally include the property value 152 determined, for example, at various times by the controller 150. For example, the property values may include a record of one or more saturated suction temperatures and/or saturated suction pressures measured by sensor 126. The discharge air temperature values 410 generally include the discharge air temperature 158 determined, for example, at various times by the controller 150. For instance, the discharge air temperature values 410 may include temperatures of airflow 122 measured with sensor 138b, as described above.

Thresholds 154 include the first threshold 412 and the second threshold 414. The first threshold 412 is generally a saturated suction temperature or pressure below which a fault is detected and the compressor 106 is operated in the freeze-prevention mode. The second threshold 414 is generally a saturated suction temperature or pressure at or above which the HVAC system 100 may revert to operation in the normal mode. The normal mode setpoint 416 is generally a target value of the discharge air temperature 158 at which to operate the HVAC system 100 during normal mode operation. The control loop parameters 418 include any settings, constants, or other parameters used to implement the control loop of FIG. 2. For example, the control loop parameters 418 may include a proportional gain and an integral gain used to implement the control loop 200 of FIG. 2, when the feedback controller 202 is a PI controller.

The I/O interface 406 is configured to communicate data and signals with other devices. For example, the I/O interface 406 may be configured to communicate electrical signals with components of the HVAC system 100 including the compressor 106, expansion valve 116, sensors 126 and 138a-b, blower 134, and thermostat 142. The I/O interface may provide and/or receive, for example, compressor speed signals blower speed signals, temperature signals, relative humidity signals, thermostat calls, temperature setpoints, environmental conditions, and an operating mode status for the HVAC system 100 and send electrical signals to the components of the HVAC system 100. The I/O interface 406 may include ports or terminals for establishing signal communications between the controller 150 and other devices. The I/O interface 406 may be configured to enable wired and/or wireless communications.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A heating, ventilation, and air conditioning (HVAC) system, the HVAC system comprising:
an evaporator configured to receive a refrigerant and transfer heat from a flow of air to the refrigerant, the evaporator comprising a sensor configured to measure a property value associated with saturated refrigerant flowing through the evaporator;
a variable-speed compressor configured to receive the refrigerant and compress the received refrigerant;

a controller communicatively coupled to the sensor and the variable-speed compressor, the controller configured to:

monitor the property value measured by the sensor;

detect a system fault, based on the monitored property value; and in response to detecting the system fault, operate the variable-speed compressor in a freeze-prevention mode, the freeze-prevention mode configured to maintain the monitored property value above a setpoint value by adjusting a speed of the variable-speed compressor, thereby delaying freezing of the evaporator during operation of the HVAC system during the detected system fault.

2. The HVAC system of claim 1, wherein the controller is configured to detect the system fault by determining that the property value is less than or equal to a predefined threshold value.

3. The HVAC system of claim 1, wherein the controller is configured to:

monitor the property value over a period of time;

determine, based on a trend of the monitored property value over the period of time, an estimated value of the monitored property value at a future time, the future time following the period of time;

detect an anticipated system fault, based on the estimated value of the monitored property value; and in response to detecting the anticipated system fault, operate the variable-speed compressor in the freeze-prevention mode.

4. The HVAC system of claim 1, wherein, during operation in the freeze-prevention mode, a discharge air temperature setpoint of the HVAC system is ignored.

5. The HVAC system of claim 2, wherein the controller is further configured to, in response to detecting the system fault:

decrease the speed of the variable-speed compressor to a first decreased speed;

following decreasing the speed of the variable-speed compressor to the first decreased speed, determine that the property value is not less than or equal to the predefined threshold value; and in response to determining that the property value is not less than or equal to the predefined threshold value, decrease the first decreased speed of the variable-speed compressor to a second decreased speed, the second decreased speed less than the first decreased speed.

6. The HVAC system of claim 5, wherein the controller is further configured to determine the second decreased speed based on a difference between the monitored property value the predefined threshold value following decreasing the speed of the variable-speed compressor to the first decreased speed.

7. The HVAC system of claim 1, further comprising:

a discharge air temperature sensor configured to measure a temperature of a flow of air discharged by the HVAC system; and wherein the controller is communicatively coupled to the discharge air temperature sensor and further configured to:

after causing the compressor to operate in the freeze-prevention mode, continue to monitor the property value;

determine that the monitored property value is greater than a threshold value; and in response to determining that the monitored property value is greater than the threshold value, operate the variable speed compressor in a normal mode, the normal mode configured to maintain the temperature of the flow of air discharged by the HVAC system near a discharge temperature setpoint value by adjusting a speed of the variable speed compressor.

8. A method of operating a heating, ventilation, and air conditioning (HVAC) system, the method comprising:

monitoring a property value measured by a sensor, the sensor configured to measure a property value associated with saturated refrigerant flowing through an evaporator;

detecting a system fault, based on the monitored property value; and in response to detecting the system fault, operate a variable-speed compressor of the HVAC system in a freeze-prevention mode, the freeze-prevention mode configured to maintain the monitored property value above a setpoint value by adjusting a speed of the variable-speed compressor, thereby delaying freezing of the evaporator during operation of the HVAC system during the detected system fault.

9. The method of claim 8, further comprising detecting the system fault by determining that the property value is less than or equal to a predefined threshold value.

10. The method of claim 8, further comprising:

monitoring the property value over a period of time;

determining, based on a trend of the monitored property value over the period of time, an estimated value of the monitored property value at a future time, the future time following the period of time;

detecting an anticipated system fault, based on the estimated value of the monitored property value; and in response to detecting the anticipated system fault, operating the variable-speed compressor in the freeze-prevention mode.

11. The method of claim 8, wherein during operation in the freeze-prevention mode, a discharge air temperature setpoint of the HVAC system is ignored.

12. The method of claim 9, further comprising, in response to detecting the system fault:

decreasing the speed of the variable-speed compressor to a first decreased speed;

following decreasing the speed of the variable-speed compressor to the first decreased speed, determining that the property value is not less than or equal to the predefined threshold value; and in response to determining that the property value is not less than or equal to the predefined threshold value, decreasing the first decreased speed of the variable-speed compressor to a second decreased speed, the second decreased speed less than the first decreased speed.

13. The method of claim 12, further comprising determining the second decreased speed based on a difference between the monitored property value the predefined threshold value following decreasing the speed of the variable-speed compressor to the first decreased speed.

14. The method of claim 8, further comprising:

after causing the compressor to operate in the freeze-prevention mode, continuing to monitor the property value;

determining that the monitored property value is greater than a threshold value; and in response to determining that the monitored property value is greater than the threshold value, operating the variable speed compressor in a normal mode, the normal mode configured to maintain a temperature of a flow of air discharged by the HVAC system near a discharge temperature setpoint value by adjusting a speed of the variable speed compressor.

15. A controller for operating a heating, ventilation, and air conditioning (HVAC) system, the controller comprising:
   a memory configured to store a setpoint value associated with operating the HVAC system in a freeze-prevention mode;
   an input/output interface configured to:
      receive measurement data from a sensor, the configured to measure a property value associated with saturated refrigerant flowing through the evaporator; and
      transmit a control signal to a variable-speed compressor of the HVAC system; and
   a processor coupled to the memory and the input/output interface, the processor configured to:
      monitor the property value measured by the sensor;
      detect a system fault, based on the monitored property value; and
      in response to detecting the system fault, cause the input/output interface to transmit the control signal, the control signal instructing the variable-speed compressor to operate in the freeze-prevention mode, the freeze-prevention mode configured to maintain the monitored property value above the setpoint value by adjusting a speed of the variable-speed compressor, thereby delaying freezing of the evaporator during operation of the HVAC system during the detected system fault.

16. The controller of claim 15, wherein the processor is configured to detect the system fault by determining that the property value is less than or equal to a predefined threshold value.

17. The controller of claim 15, wherein the processor is further configured to:
   monitor the property value over a period of time;
   determine, based on a trend of the monitored property value over the period of time, an estimated value of the monitored property value at a future time, the future time following the period of time;
   detect an anticipated system fault, based on the estimated value of the monitored property value; and
   in response to detecting the anticipated system fault, cause the input/output interface to transmit the control signal, the control signal instructing the variable-speed compressor to operate in the freeze-prevention mode.

18. The controller of claim 15, wherein during operation in the freeze-prevention mode, a discharge air temperature setpoint of the HVAC system is ignored.

19. The controller of claim 16, wherein the processor is further configured to, in response to detecting the system fault:
   decrease the speed of the variable-speed compressor to a first decreased speed;
   following decreasing the speed of the variable-speed compressor to the first decreased speed, determine that the property value is not less than or equal to the predefined threshold value; and
   in response to determining that the property value is not less than or equal to the predefined threshold value, decrease the first decreased speed of the variable-speed compressor to a second decreased speed, the second decreased speed less than the first decreased speed, wherein the second decreased speed is determined based on a difference between the monitored property value the predefined threshold value following decreasing the speed of the variable-speed compressor to the first decreased speed.

20. The controller of claim 15, wherein the processor is further configured to:
   after causing the compressor to operate in the freeze-prevention mode, continue to monitor the property value;
   determine that the monitored property value is greater than a threshold value; and
   in response to determining that the monitored property value is greater than the threshold value, cause the input/output interface to transmit a second control signal, the second control signal instructing the variable speed compressor to operate in a normal mode, the normal mode configured to maintain the temperature of the flow of air discharged by the HVAC system near a discharge temperature setpoint value by adjusting a speed of the variable speed compressor.

* * * * *